INVENTORS
MORRIS I. COHN
ROY D. PERDUE

Inventors
MORRIS I. COHN
ROY D. PERDUE 3,576,657
METHOD OF TREATING WOLLASTONITE
Morris I. Cohn, Glencoe, Ill., and Roy D. Perdue, Andover, Mass., assignors to Elliot E. Rosenberg, trustee of Mica Trust, Boston, Mass.
Continuation-in-part of application Ser. No. 646,950, June 19, 1967. This application July 26, 1967, Ser. No. 668,267
Int. Cl. C09c 1/02, 1/30
U.S. Cl. 106—306
8 Claims

ABSTRACT OF THE DISCLOSURE

A method of commercially producing finely divided pigments and fillers of high brightness and low bulk density from wollastonite by reacting it in the form of an aqueous slurry of fine wollastonite particles with a limited amount of phosphoric acid in a molar ratio of calcium to phosphorous in the wollastonite and phosphoric acid, respectively, substantially greater than 1.5. The reaction is carried out with agitation and preferably with the addition of heat. In terms of weight ratios, the phosphoric acid-wollastonite weight ratio is substantially below 0.52. In terms of stoichiometric quantities, the wollastonite particles are reacted with an amount of phosphoric acid which is substantially less than the stoichiometric amount for forming calcium orthophosphate, triphosphate), preferably 75% or less of such stoichiometric amount.

The reaction product is subjected to a hydroclassification step, such as a hydrocyclone, to reduce the abrasiveness of the reaction product, the desired pigments being obtained as an overflow from the hydrocyclone.

The underflow from the hydrocyclone may be recycled through the reactor to further reduce abrasiveness of the final product.

Improved results are achieved by subjecting the reaction product from the reactor, in the form of an aqueous slurry, to high shear forces, e.g. a homogenizing valve, and further heating before passing it to the hydrocyclone, and/or subjecting the underflow from the hydrocyclone to such shearing froces before recycling back to the reactor.

The reaction product of the acid and wollastonite consists essentially of finely divided particles having a core or nucleus of unreacted wollastonite or calcium metasilicate coated with a white mixture of a calcium oxide-phosphorus oxide complex, at least part of which is in the form of a crystalline hydroxylapatite, and an amorphous silica. It is believed that calcium oxide-phosphorus oxide complex in amorphous form is also present in the coating. Hydroxylapatites are calcium oxide-phosphorus oxide-hydroxyl complexes (calcium hydroxyl phosphates) such as $Ca_5(OH)(PO_4)_3$ and $Ca_2(OH)(PO_4)$. The molar ratio of calcium to phosphorus in the reaction product particles is substantially greater than 1.5.

This application is a continuation-in-part of our application Ser. No. 646,950, filed June 19, 1967, now abandoned.

BRIEF SUMMARY OF THE INVENTION

Commercially pure grades of wollastonite, a naturally occurring calcium metasilicate, are prepared by crushing and grinding of the ore to a point where liberation of magnetic and non-magnetic components occur. After magnetic separation, fine grinding and air classification provide a variety of products for use as pigments and fillers in ceramics, paints, paper and other miscellaneous uses. Such commercial products have a brightness approaching 92 on the Standard Brightness Tester, have a useful acicular shape and have a relatively low bulk density. In addition, it is well known that such finely ground commercial grade products can be reacted with a variety of mineral acids whereby the lime and silica components of the mineral are chemically reacted to form new pigments.

Chemically derived pigments from wollastonite are in many cases finer and brighter than those products prepared by simple dry milling. In that a large market exists in the paper, paint, insecticide, leather and plastics industries for bright and/or finely divided pigments with particle size of four or five microns and smaller, it is of economic interest to provide means of preparing such materials from a relatively cheap raw material such as wollastonite.

One such chemical route involving wollastonite and muriatic or nitric acid is described in U.S. Pat. No. 2,686,731. After dissolving the wollastonite in the mineral acid, the soluble hydrated silica is reacted with slurries or solutions of calcium, barium, zinc or magnesium hydrates alone or in combination. Unfortunately, these pigments are inherently expensive to produce because of the high cost of these acids.

Other products can be derived from wollastonite and sulphuric acid or phosphoric acid or from a combination of these acids. The products derived from sulphuric acid have substantial solubility because of the presence of calcium sulphate in the reaction product. Calcium sulphate, when used as a filler material in conventional paper-making processes, forms a part of the recirculating white water and, because of its solubility characteristics, can cause crystal formation and plugging at various points in the process. Some application for calcium sulphate exists and mixtures containing it and other pigments do find limited applications in paper making, but the market for such a pigment in the broad areas of paper and rubber manufacture has never been large.

When wollastonite is treated with orthophosphoric acid and water, a hydrated pigment of great insolubility and high brightness is obtained. The reaction involved is as follows:

$$3(CaO.SiO_2) + 2H_3PO_4 \rightarrow Ca_3(PO_4)_2 + 3(SiO_2.H_2O)$$

or $3(CaO.SiO_2) + 2H_3PO_4 + xH_2O \rightarrow Ca_3(PO_4)_2.xH_2O + 3(SiO_2.H_2O)$

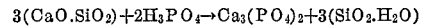

Reacting weights:

| 348 | 196 | 18x | (310+18x) | 234 |

Thus, the stoichiometric ratio is approximately 196 to 348 or 0.562.

Phosphoric acid yields a totally insoluble pigment as indicated above and one that is brighter than that produced from sulphuric acid because of the insolubilization of iron impurities as colorless iron phosphates. However, this route to a chemical pigment has not been commercially practical because of the high cost of the phosphoric acid.

The present invention is based on the surprising discovery that highly insoluble, finely divided, white pigments, having a high brightness and low bulk density and which are accordingly highly suitable for use as a pigment or filler in paper, ceramics, rubber, etc., can be economically obtained by reacting with agitation, an aqueous slurry of the wollastonite particles with a limited amount of phosphoric acid to provide a molar ratio of calcium to phosphorus in the wollastonite and phosphoric acid, respectively, which is substantially greater than 1.5, and preferably substantially greater than 2 or 3 and as high as 8 or more. Excellent results have been achieved with a molar ratio of calcium to phosphorus of between 2.5 and 3. In terms of weight ratio of phosphoric acid to wollastonite, an amount of phopshoric acid is used to provide such a ratio which is substantially below 0.52 and as low as 0.3 or 0.2 or less. In terms of stoichiometric amounts, the amount of phosphoric acid used is substantially less than the stoichiometric amount of phosphoric acid for forming calcium ortho(tri)phosphate, preferably 75% or less and as low as 50% or less. In this way, the cost of producing phosphoric acid derived wollastonite pigments which have properties making them highly desirable as paper, ceramic and rubber fillers, is reduced to a point where they are economically attractive.

Electron photomicrographs and X-ray diffraction examination of the reaction product show it to be made up of tiny, flat, elongated particles made up of a core or nucleus of the unreacted crystalline wollastonite or calcium metasilicate coated with a white coating comprising a mixture of a calcium oxide-phosphorus oxide complex, at least part of which is in the form of crystalline hydroxylapatite, and an amorphous silica. It is also believed that the coating contains a calcium oxide-phosphorus oxide complex in amorphous form. The molar ratio of calcium to phosphorus in the reaction product particles is substantially greater than 1.5 and is preferably greater than 2.00 or 3.00. The product has a low bulk density and a high brightness and constitutes a new composition of matter so that the invention also relates to new composition of matter.

The present invention is also based on the discovery that by subjecting the aforesaid reaction product of wollastonite and phosphoric acid to a hydroclassifying step, such as hydrocyclone, the abrasiveness thereof is sharply reduced below that of the wollastonite feed to thereby make the product more desirable as a pigment for certain uses.

Furthermore, it has been found that abrasiveness can be reduced by subjecting the reaction product to high shear forces, as for example, by passage under pressure through a homogenizing valve such as that described in U.S. Pat. No. 3,039,703 and to further heat, e.g. boiling, either with or without subsequent treatment in the hydroclassifier.

The overflow from the hydrocyclone contains the desired product, which is dewatered and dried to give the final product. It has been found that by recycling through the reactor the underflow containing the abrasive components, the cost can be reduced still further and the abrasiveness of the final product can be lowered even further. It has been found that under certain conditions, all of the underflow can be continuously recycled since after a few cycles the amount of overflow becomes stabilized.

Where the wollastonite and acid are continuously added to the reactor in the aforesaid ratio, the underflow from the cyclone can be recycled throught he reactor without adding any additional acid.

The abrasiveness of the reaction product can be further reduced by subjecting the underflow of the hydrocyclone to a high shear force, as for example, a homogenizing valve as described in U.S. Pat. No. 3,039,703, before recycling it back through the reactor. The underflow may also be subjected to a heating step, e.g. boiling, before recycling.

The formation and hydration of amorphous silica from the wollastonite metasilicate crystal by the phosphoric acid takes place simultaneously with the reaction between the CaO of the wollastonite with the phosphoric acid. It is not known what effect this simultaneous reaction has. For example particles of unreacted wollastonite may become coated with silica gel blocking further acid attack. The effect may be different at various points in the reaction, i.e., as the pH changes.

Amorphous hydrated silica is not the only noncrystaline material which may be present. However, it is not known what the other amorphous material is, although it is believed to be a calcium oxide-phosphorus oxide complex. It is known, however, that when lime is used to neutralize phosphoric acid with Ca/P mole ratios greater than unity, amorphous material is commonly present.

As indicated earlier, the wollastonite feed for our process can be prepared from the raw ore by dry crushing and grinding to a point where liberation of magnetic and non-magnetic impurities occur. Additional steps include separation of these impurities either by use of magnetic or specific gravity separators followed by fine grinding and classification. Removal of these impurities can also be accomplished by wet magnetic separation followed by hydroclassifiers such as cyclones and solid bowl centrifuges.

All other things being equal, the finer the particle size of the feed, the more reactive the feed. However, particle size is not the only factor. A feed that is finer than 200 mesh prepared by dry beneficiation and grinding can be more reactive than a feed that is finer than 325 mesh which has been prepared by the aforementioned wet methods.

The wollastonite feed can be made more reactive by first wet shearing it with a high intensity agitator or a homogenizing valve such as that described in U.S. Pat. No. 3,039,703.

DETAILED DESCRIPTION

Figure 1:
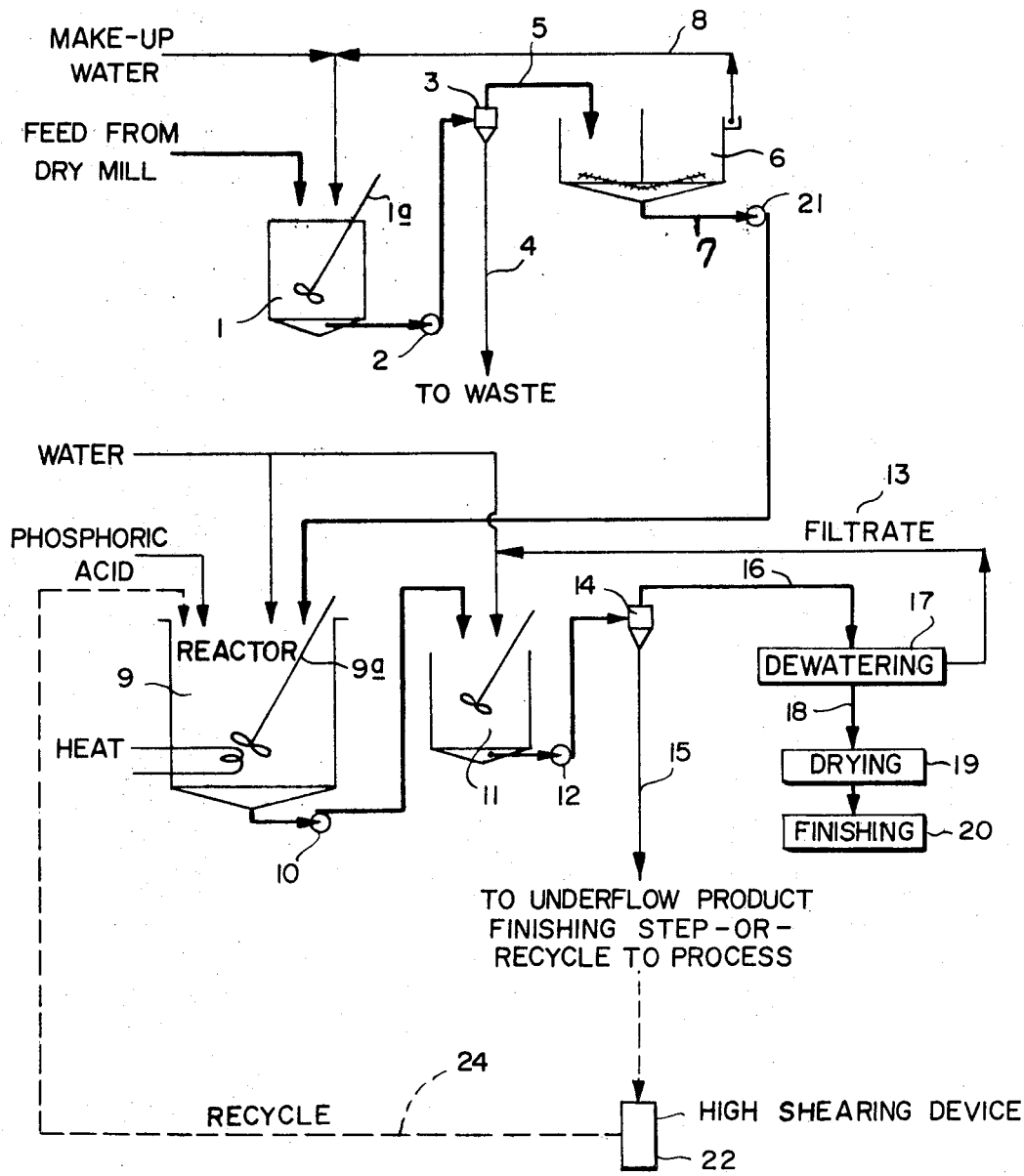
FIG. 1 represents a flow sheet for carrying out an embodiment of our invention.

The wollastonite feed for the process is furnished by a conventional dry milling flowsheet. The feed is slurried with recycle and make-up water in tank 1 provided with an agitator 1A. The slurry flows to pump 2 which passes it through hydrocyclone 3. The underflow 4 from this hydrocyclone contains heavy abrasive and non-reactive minerals which were not completely removed from the calcium metasilicate by the dry beneficiation. The overflow 5 is passed to a conventional gravity thickener 6 which removes water and thereby concentrates the cyclone overflow to a thicker slurry 7 which is more suitable for the subsequent reaction with phosphoric acid than the dilute cyclone overflow. The water 8 from this step can be recycled to tank 1.

Pump 21 transfers the thickened slurry to the reactor 9 equipped with an agitator 9A. Here phosphoric acid and water together with heat (provided by flowing steam into the reactor) and agitation provide for conversion of the wollastonite to a high Ca/P mole ratio hydroxylapatite-hydrated amorphous silica composition. After a suitable reaction period, the reaction slurry is passed to pump 10 which passes it to agitated tank 11. The reaction slurry is diluted with cold water some of which is obtained from filtrate 13 from a later dewatering step 17.

From tank 11, the diluted reaction slurry is passed via pump 12 to hydrocyclone 14 which rejects unreacted wollastonite, oversize particles and abrasive impurities to the underflow 15. The overflow 16 containing the finished product is passed to conventional dewatering equipment 17 for dewatering. Filter presses are suitable devices for this purpose. The filter cake 18 is prepared for flash drying, spray drying or other suitable and conventional drying in 19 and passed to finishing operations 20 such as deagglomeration, bulk storage, or packaging.

The underflow from cyclone 14 may be passed one or more times through a high shearing device such as the homogenizing valve described in U.S. Pat. No. 3,039,703 designated as 22 in FIG. 1 and then recycled back to the reactor through line 24. Before passage to the valve 22, the underflow may be boiled for a period of an hour or more.

Wollastonite can be found in a high state of purity in a massive deposit in and around Essex County in Northern New York State. This deposit provides a medium hard ore which contains 50–60% anhydrous calcium metasilicate in the presence of garnet and diopside. The deposit is such that the wollastonite has remarkable purity and chemical uniformity. The work hereinafter described was based on wollastonite derived from this deposit by dry beneficiation methods whereby at least 95% purity was achieved. However, the methods of the invention can be applied to other calcium metasilicates of both natural and synthetic origin.

EXAMPLE

Conditions, in the hydrocyclone circuit represented by Items 1, 2, 3, 4 and 5 in FIG. 1 are presented in Table I below:

TABLE I.—REMOVAL OF ABRASIVE HEAVY MINERALS FROM WOLLASTONITE FEED TO PROCESS

| | |
|---|---|
| Feed to tank 1 | Wollastonite concentrate from a conventional dry ore grinding device and conventional separators, in which impurities released by the grinding and oversize particles were removed, and gound in a fluid energy dry grinding mill, utilizing a high velocity air stream and sold under the name Micronizer by Sturtevant Corporation, to pass Hegman 5½ (equivalent to 3½ microns). Other known dry grinding fluid energy mills can be used. |
| Cyclone 3 | 3 inch fitted with ¾ inch vortex finder and ¼ inch underflow orifice operating at 90 p.s.i. |
| Percent solids by weight: | |
| Feed to cyclone | 10. |
| Underflow of cyclone 4 | 42. |
| Overflow of cyclone 4 | 9.8. |
| Recovery (feed reporting to overflow). | 97.5% of feed to cyclone. |

After thickening the cyclone overflow to a slurry concentration of 15% in conventional gravity thickener 6, such overflow is reacted with phosphoric acid in reactor 9 with the application of heat. The batch weights are listed in Table II. Note that the value given for water includes that added as such and the water already present in the thickened feed slurry as well as the water in the 85% phosphoric acid.

TABLE II

Batch formula in reactor 9

| | Parts |
|---|---|
| Wollastonite | 232 |
| $H_3PO_4$ (85%) | [1] 73 |
| Water | 3000 |
| $H_2PO_4$/wollastonite ratio | 0.3 |

[1] Not including water in acid.

The water and phosphoric acid are mixed in the reactor with agitation. A surfactant such as Aerosol TR is added in order to improve wetting of the solids. We also believe that the presence of a surfactant helps to produce a pigment of smaller particle size. The amount of Aerosol TR based on the quantities of Table II above is 0.15 part. The slurry of wollastonite is then charged to the reactor with intense agitation. Heat is applied to the contents of the reactor by adding steam. The batch is subjected to intense agitation during the entire reaction.

Table III below represents a typical log from a batch which was run with the reactants listed in Table II.

TABLE III.—TYPICAL LOG OF REACTOR CONDITIONS AND PROCESS STEPS DURING REACTION OF WOLLASTONITE WITH PHOSPHORIC ACID

| Time elapsed, (minutes) | Temp., °F. | pH | Remarks |
|---|---|---|---|
| 0-1 | 113 | 1 | Wollastonite slurry charged to acid solution. |
| 3 | 128 | 4.5 | Mixing. |
| 7 | 140 | 5.0 | Do. |
| 11 | 158 | 6.8 | Slight thickening. |
| 14 | 176 | 6.8 | Mixing. |
| 18 | 190 | 4.5 | Marked thickening—add 1,000 parts water to reduce viscosity. |
| 19 | 171 | 5.0 | Do. |
| 21 | 167 | 5.0 | Do. |
| 22 | 158 | 5.0 | Do. |
| 25 | 196 | 5.0+ | Very thick—slow mixing. |
| 29 | 185 | 5.0 | Do. |
| | Shut down | | |

Referring to the log presented in Table III above, further boiling of the batch for one-half hour results in the pH rising from 5.0 to 6.8.

Table IV below gives some properties of reaction products obtained at this point using different ratios of added acid to added wollastonite i.e., utilizing different mole ratios of calcium to phosphorus in the added wollastonite and acid, respectively, such ratios being referred to as Ca/P mole ratio.

These materials are useful as pigments by virtue of their low bulk density and high brightnesses, as compared to the wollastonite. Unquestionably, the wollastonite has not been totally reacted in those batches having very high Ca/P mole ratios. The bulk density seems to vary directly with this ratio.

TABLE IV.—PROPERTIES OF CHEMICALLY PREPARED PIGMENTS DISCHARGED FROM REACTOR AS A FUNCTION OF Ca/P MOL RATIO AFTER DEWATERING AND DRYING

| Batch No. | Wollastonite to $H_3PO_4$, weight ratio | $H_3PO_4$ to wollastonite, weight ratio | Ca/P, mole ratio | Abrasion,[1] mg. wire loss | Bulk density, lbs./cu. ft. | Brightness |
|---|---|---|---|---|---|---|
| 1 | | | | | | |
| 2 | 1.97 | 0.51 | 1.66 | 137 | 6.6 | 95.5 |
| 3 | 2.47 | 0.407 | 2.09 | 167 | 7.8 | 96.3 |
| 4 | 3.28 | 0.305 | 2.77 | 209.8 | 6.4 | 96.5 |
| 5 | 4.92 | 0.203 | 4.15 | 195 | 8.6 | 95.2 |
| 6 | 6.51 | 0.153 | 5.54 | 260 | 10.3 | 95.2 |
| 7[2] | 9.87 | 0.101 | 8.32 | 261 | 13.8 | 94.5 |
| | 9.87 | 0.101 | 8.32 | 95.3 | 14.3 | 92.0 |
| Raw wollastonite feed | | | | 181 | 21.6 | 92.0 |

[1] Valley Iron Works abrasion tester.
[2] Passed through high shear valve described in Pat. No. 3,039,703 two times and then boiled for additional one hour period.

A Ca/P ratio of 8.32 (acid-wollastonite ratio of 0.10) provides good results with some sacrifice in the reduction in bulk density. In fact, some advantage is achieved with acid-wollastonite ratio as low as 0.05 and even lower.

The reason for the variation of abrasiveness of the products in Table IV is difficult to explain. In that the initial raw feed has an abrasion of 181, the fact that batches 5 and 6 give abrasion values significantly in excess of this figure is puzzling. In that the calcium phosphate in the form of hydroxylapatite and hydrated amorphous silica are relatively non-abrasive, another compound or composition may be forming which is highly abrasive.

The effect on abrasion caused by more agitation or shear together with additional heating is significant as shown by batches 6 and 7 of Table IV. It may be that a minor amount of abrasive intermediate product has been converted to another less abrasive one. It has been found that the abrasion of these reaction products can be sharply reduced while at the same time either not affecting or improving bulk density and brightness effects by passing them through a hydrocyclone, preferably after being diluted. In FIG. 1, this step is represented by items 11, 12, 14, 15 and 16. Data obtained on a once through basis under various cycloning conditions are presented in Table V below.

The data in Table V indicates some sacrifice in recovery which accompanies the reduction in abrasion by cycloning. The overflow product of the 1⅛ inch cyclone has a low abrasion and other properties (low bulk density and high brightness) which make it highly suitable for application as a paper filler. The underflow product containing the more abrasive components has utility in paint, rubber and other applications. The properties of these products are listed in Table VI below.

TABLE V.—HYDROCYCLONE (14 IN FIG. 1) PERFORMANCE ON A ONCE THROUGH BASIS TO REDUCE THE ABRASION OF CHEMICALLY PREPARED PIGMENTS FROM WOLLASTONITE (Ca/P MOLE RATIO=2.77)

[Feed to hydrocyclone 14 was batch No. 3 of Table IV]

| Cyclone 14 in Fig. 1 | Pressure, p.s.i. | Vortex finder, in. | Underflow orifice, in. | Feed solids content, percent by weight | Underflow solids content, percent by weight | Overflow solids content, percent by weight | Recovery to overflow based on feed to cyclone, percent by weight |
|---|---|---|---|---|---|---|---|
| 3 in | 60 | ¾ | ⅜ | 1.6 | 6.25 | 1.41 | 84.4 |
| | | Abrasion of overflow is 90.8 mg. wire loss | | | | | |
| 1⅛ in | 65 | 0.16 | 0.090 | 0.77 | 3.04 | 0.498 | 57.6 |
| | | Abrasion of overflow is 46 mg. wire loss | | | | | |

TABLE VI.—PROPERTIES OF DEWATERED AND DRIED PRODUCTS OBTAINED AT OVERFLOW IN TABLE V BY SINGLE PASS USE OF HYDROCYCLONE (Ca/P MOLE RATIO=2.77)

| Product | Abrasion (mg. wire loss) | Bulk density (lbs./cu. ft.) |
|---|---|---|
| 3″ cyclone overflow | 90.8 | 5.45 |
| 3″ cyclone underflow | High | 11.5 |
| 1⅛″ cyclone overflow | 46 | 4.50 |
| ⅛″ cyclone underflow | 193 | 8.9 |

The initial abrasion of the Wollastonite feed was 181 mg. wire loss.

If it is desired to make a single product which has the properties of the hydrocyclone overflow without simultaneous production and sale of an abrasive underflow stream, this is done as follows: Referring to FIG. 1, after completion of the acid-wollastonite reaction in reactor 9, the slurry is passed to the same hydrocyclone (14) circuit mentioned earlier. The overflow 16 is sent to the last finishing steps of the flowsheet. This time, however, the underflow 15 from cyclone 14 is returned to reactor 9 and carried through the reaction step again in reactor 9 in the presence of the same quantities of newly added acid and wollastonite as if no recycle stream were present, i.e. the recycled underflow is mixed with newly added wollastonite and acid added in the same ratio as Table II with no additional acid for the recycled underflow. The reaction is carried on routinely in reactor 9 and the reaction slurry is passed again to the hydrocyclone (14) circuit, again returning the underflow 15 to the reactor 9, as aforesaid, and sending the overflow stream 16 to the finishing steps.

An additional step may be performed on the hydrocyclone 14 underflow before returning it to the reactor 9. As indicated above, when discussing the abrasive properties of the batches listed in Table IV, the effect of shear and additional cooking (without further acid addition) of the reaction product on lowering abrasion was noted. Similarly, the underflow from the hydrocyclone 14 may be passed through a high shear device and/or subjected to additional cooking before mixing it with the feed materials (newly added acid and wollastonite) for the next batch, i.e. before recycling it back to the reactor, to accomplish the same purpose. A device which is especially suited for this purpose is described and shown in our aforesaid patent, U.S. 3,039,703. This patent describes a homogenizing or high shear valve of rugged construction which is designed for the treatment of abrasive minerals in the form of an aqueous slurry passed through the valve under pressure. However, other conventional shearing apparatus or mills can be used although the results achieved thereby are not as marked as with the use of the homogenizing valve.

Table VII below describes conditions and the types of product generated with recycling of the underflow of cyclone 14 back to reactor 9 for further treatment.

TABLE VII.—HYDROCYCLONE (14) PERFORMANCE WHEN RECYCLING UNDERFLOW TO REDUCE THE ABRASION OF CHEMICALLY PREPARED PIGMENTS FROM WOLLASTONITE (Ca/P MOLE RATIO=2.77)

[1⅛″ cyclone 14 used with 0.20 inch vortex finder, 0.09 inch underflow orifice and operated at 65 p.s.i.]

NOTE.—The first recycle occurs in cycle No. 2 where the overflow from cyclone 14 was recycled back to the reactor and mixed with a new batch of acid and wollastonite.

| Cycle No. | Feed to cyclone 14 solids content, percent by weight | Underflow solids content, percent by weight | Overflow solids content, percent by weight | Recovery to overflow percent of feed to cyclone | Parts to overflow | Overflow Abrasion, mg. wire loss | Overflow Bulk density, lbs./cu. ft. |
|---|---|---|---|---|---|---|---|
| 1 | 0.74 | 7.93 | 0.466 | 60.6 | 60.6 | 38.1 | 5.1 |
| 2 | 1.03 | 13.03 | 0.517 | 48 | 67.0 | 42.4 | 5.7 |
| 3 | 1.00 | 12.48 | 0.523 | 50.0 | 86.2 | 35.8 | 5.1 |
| 4 | 1.18 | 14.84 | 0.559 | 45.1 | 84.1 | 43.8 | 4.8 |
| 5 | 1.17 | 13.48 | 0.574 | 49.4 | 100 | 39.8 | 5.3 |
| 6[1] | 1.16 | 13.99 | 0.472 | 38.7 | 78.2 | 40.5 | 5.7 |
| 7[1] | 1.17 | 15.30 | 0.521 | 42.5 | 95.0 | 35.3 | 5.1 |
| 8[1] | 1.29 | 15.72 | 0.578 | 42.5 | 97.4 | 27.8 | 4.8 |
| 9[1] | 1.23 | 15.22 | 0.560 | 43.6 | 101.0 | 21.2 | 4.8 |
| 10[1] | 1.25 | 15.41 | 0.576 | 44.0 | 101.7 | 33.1 | 5.2 |

[1] Previous cycle underflow passed through high shear valve of U.S. Pat. No. 3,039,703.

In Table VII, the values entered in the column headed "Parts to Overflow" are calculated from a material balance as follows: It is arbitrarily assumed that 100 parts of new solids are made in the reactor each time a batch is charged and reacted. After passing the reaction mass solids of cycle 1 through the hydrocyclone 14, 60.6 parts leave the system as overflow and 39.4 parts are returned from the undreflow to the reactor. As a simplifying assumption, these 39.4 parts are treated as if they react only with water when they are mixed with the reactants for the next batch. It is again assumed that 100 parts of new solids are made in cycle 2 and these 100 parts together with the 39.4 parts added to the batch are sent to the cyclone. These calculations are summarized for all cycles in Table VIII.

TABLE VIII.—ESTIMATED MATERIAL BALANCE WHEN RECYCLING UNDERFLOW TO REDUCE THE ABRASION OF CHEMICALLY PREPARED PIGMENTS FROM WOLLASTONITE (Ca/P MOLE RATIO=277).

| Cycle No. | Parts from last batch | Parts passed through cyclone | Parts reporting to overflow | Parts recycled to next batch | Remarks |
|---|---|---|---|---|---|
| | 0 | 100 | 60.6 | 39.4 | |
| | 39.4 | 139.4 | 67.0 | 72.5 | |
| 3 | 72.5 | 172.5 | 86.2 | 86.2 | |
| 4 | 86.2 | 186.2 | 84.1 | 102.1 | |
| 5 | 102.1 | 202.1 | 100 | 102.1 | |
| 6 | 102.1 | 202.1 | 78.2 | 123.9 | Note v. |
| 7 | 123.9 | 223.9 | 95.0 | 128.9 | Do |
| 8 | 128.9 | 228.9 | 97.4 | 131.5 | Do. |
| 9 | 131.5 | 231.5 | 101.0 | 130.5 | Do. |
| 10 | 130.5 | 230.5 | 101.7 | 128.9 | Do. |

NOTE 1.—Underflow of previous cycle passed through high shear valve of U.S. Pat. No. 3,039,703.

Referring to Tables VII and VIII, it is seen that the hydrocyclone underflow 15 (FIG. 1) becomes stabilized and hence can be continuously recycled. A small portion of the underflow, e.g. 5 to 20%, from cyclone 14, can be discarded with the remainder being recycled, or the entire underflow stream or part of it can be returned to tank 1 and passed with fresh feed from the dry mill through hydrocyclone 3. Of course, recycle can be omitted altogether.

The effect of treating the recycled hydrocyclone underflow 15 in a high shear valve in batches 6–10 is seen in Table VII in the column showing the abrasion of the overflow product. The average abrasion of the product from the first five cycles was 40.0 mg. wire loss and the average abrasion of the product from the last five cycles was 31.6 mg. wire loss.

Dewatering of any of the products described in the foregoing disclosure is accomplished routinely in conventional dewatering unit 17 of FIG. 1. At the concentrations used in cycloning in cyclone 14, the overflow and underflow solids will settle, thereby permitting the use of conventional gravity thickeners ahead of filtration equipment. The use of filter presses, drum filters or the like as the filtration equipment can be employed.

With respect to drying step 19, conventional batch shelf driers have been used in the foregoing work. However, spray driers may also be used as well as flash driers and other types of continuous drying equipment.

While the use of a hydrocyclone 14 for lowering the abrasion of the product has been described in the foregoing disclosure, solid bowl centrifuges, hydroclassifiers or other wet classifying devices may be used.

Whereas in the example given above, the wollastonite was added to the acid and water in the reactor so that the system in the reactor was acidic during the entire reaction, the acid may be added, preferably gradually at a controlled rate, to the water and wollastonite, i.e. the aqueous wollastonite slurry, in the reactor with intense agitation, in which case the reaction conditions in the reactor remain basic during the reaction, i.e. at a pH above 7. In such case the acid is preferably added as a relatively dilute aqueous solution, e.g. 5–20% by weight. The rate of addition of the acid is controlled so that the batch does not become too thick and remains easily stirrable at all times. The acid may be added in four or five shots. If all the acid is added at once, or is added too quickly, the batch usually becomes too thick for efficient stirring. The correct rate of addition of the acid can be easily determined by observing the thickness or viscosity of the batch. Heat is preferably added to the batch in the reactor as in the case of adding the wollastonite to the acid. In one case, using a Ca/P ratio of 2.77, the slurry was heated in the reactor by flowing steam into the slurry to a temperature slightly in excess of 185° F. before the acid was added and the temperature rose to about 210° F. during addition of the acid due to exothermic heat of reaction. By carrying out the reaction in this way, i.e. by gradually adding the acid, in the form of a dilute aqueous solution, to the wollastonite and water, it may not be necessary to add water (other than that originally in the acid and in the wollastonite slurry) during the reaction to reduce thickness. Also, the solids concentration of the wollastonite feed may be substantially higher, e.g., 50–60% solids by weight, so that the percent solids in the reactor is substantially higher which provides for greater reactor capacity. In the aforesaid case, where the slurry was heated slightly in excess of 185° F., a wollastonite solids feed concentration of 56% was used with an acid diluted with water to about 5% and added gradually to the wollastonite slurry in four shots. In this case, the percent solids in the reactor at the end of the reaction was between 30 and 40% solids. In some cases, even when the dilute acid is added to the wollastonite, it is still necessary to add water during reaction to prevent the reaction mix from becoming too stiff to readily stir. In such case enough water is added to again render the reaction mix readily stirrable. The use of a dilute acid solution aids in preventing the mix from becoming too stiff. It has been found that where the reaction is carried out in this way, i.e., by adding acid to wollastonite slurry, although the overflow from cyclone 14 is basic, e.g., 8.2, when water is added to the filtered and dried solids from the overflow from cyclone 14, the pH of the resulting slurry is acidic, e.g. 6.5. The reason for this is not understood.

The solids concentration of the wollastonite feed to the reactor may vary from a fraction of a percent to the maximum percent solids at which the slurry remains easily stirrable. As aforesaid, the maximum solids concentration of the wollastonite feed to the reactor depends on whether the wollastonite is added to the acid or vice versa. Where the acid is added to the wollastonite and water, solids concentrations of wollastonite in the feed to the reactor may be as high as 60% by weight and in some cases even higher. Where the wollastonite is added to the acid, the maximum solids concentration should be much less, e.g. 25–30% by weight or less. Whichever way the acid and wollastonite are mixed, it is advantageous to utilize the highest solids concentration in the reactor which can be used without rendering the mix too stiff to be readily stirred.

The hydrocyclone 3 may be omitted where the wollastonite raw material is relatively pure and when it is omitted, the thickener 6 may also be omitted so that the wollastonite is fed directly to the reactor.

Although it is highly preferred to add heat to the reactor, it need not be added in all cases. The reaction is exothermic so that the temperature of the reaction mass rises even if no heat is added. In the work that has been done, the highest temperature in the reactor was the atmospheric boiling temperature of the reaction mix.

It is preferred to boil the reaction mix (e.g. by passing steam into the reaction mix) after completion of the reaction. It has been found that boiling for one or two hours substantially reduces the viscosity of the mix and the abrasion of the end product.

Enough water should be added to the reaction mass in tank 11 to make it sufficiently fluid to permit efficient treatment in the hydrocyclone. The proper solids concentration for efficient operation of the hydrocyclone is well known to the art. It may vary from a fraction of a percent to 15 to 25% by weight.

When cyclone 3 is used, the solids concentration in tank 1 should also be such that efficient hydrocycloning can be carried out in 3.

Where the reaction product solids, in the form of an aqueous slurry, are subject to shearing, as for example by passage through a homogenizing valve 22, it is preferred to add a solids dispersing agent, such as sodium polyphosphate, to the slurry before the shearing operation. This facilitates shearing, especially at high solids concentrations. Where sodium polyphosphate is thus used with recycle of the sheared solids, the polyphosphate is recycled back to the reactor to thereby aid in dispersing the solids in the reactor during reaction to reduce thickening effect in the reactor. This permits the use of higher solids concentrations in the reactor.

Figure 2:
FIG. 2 is an electron photomicrograph of the reaction product of the invention.
Figure 3:
FIG. 3 is another electron photomicrograph of another reaction product of the invention.

Electron photomicrographs of the overflow reaction products using a 1⅛″ cyclone 14 and after dewatering and drying, were taken and are shown in FIGS. 2 and 3. The reaction product of FIG. 2 was derived from adding phosphoric acid to wollastonite as described hereinbefore using a Ca/P mole ratio of 2.77. The reaction product of FIG. 3 was derived from adding wollastonite to acid as described hereinbefore using a Ca/P mole ratio of 2.77. The white coating over the wollastonite nucleus can be observed in the photographs in which the magnification is 30,000×. These photographs, together with X-ray diffraction tests show that the reaction product consists essentially of finely divided particles from 1 micron to 4 microns in size made up of a wollastonite nucleus coated with a white coating containing crystalline calcium oxide-phosphorus oxide-hydroxyl complex in the form of a hydroxylapatite. Some of the white coating is believed to be amorphous silica so that the coating contains a mixture of the hydroxylapatite and amorphous silica. It is also believed that the reaction product contains calcium oxide-phosphorus oxide complex in amorphous form, probably as part of the coating. The reaction product contains very little, if any, free lime, as indicated by practically no calcium in the mother liquor, even though a large excess of wollastonite is used relative to acid. The Ca/P molar ratio in the reaction product particles is greater than 1.5. It is at least as great as the Ca/P molar ratio in the wollastonite and acid feed.

Preferably the average particle size of the wollastonite feed is between 1 micron and 40 or 50 microns in size. From 1 micron to 10 microns give the best results. The average particle size of the wollastonite feed used to make the reaction products shown in FIGS. 2 and 3 was 3 microns.

By proper choice of feed, reaction conditions, and hydroclassification conditions, i.e. conditions in the cyclone 14, and by subjecting the reaction product to high shearing, either individually or in combination, high yields of final reaction products having an average particle size of 0.5 micron, 0.1 micron and even smaller can be obtained in accordance with the present invention. The average particle size of the final reaction product may vary from 0.1 and even smaller to 10 microns. Preferably, the average particle size should not be greater than 4 microns. As a general rule, the smaller the average particle size, the better, consistent with economic yield. The average particle size of the reaction product shown in FIGS. 2 and 3 is substantially less than three microns. Many of the particles in FIGS. 2 and 3 are less than 1 micron in size.

It is not intended that the invention be limited by or to the aforesaid descriptions but only to the methods and compositions claimed below and their equivalents.

We claim:
1. A method of preparing fine particled crystalline and amorphous solid pigments comprising reacting with agitation an aqueous slurry of calcium metasilicate and phosphoric acid in a molar ratio of calcium to phosphorous in the metasilicate and acid, respectively, of higher than 1.5 and shearing the reaction product, thus produced, as an aqueous slurry of reaction product solids, by passing it through an homogenizing valve to thereby lower the abrasiveness of said solids.
2. A method according to claim 1, also including passing the reaction product through a wet classifier to reduce the abrasion thereof.
3. A method according to claim 2, said wet classifier comprising a hydrocyclone.
4. A method according to claim 3, also comprising recycling of the underflow from said hydrocyclone to the reactor.
5. A method according to claim 4, said underflow being recycled through the reactor and mixed in the reactor with additional calcium metasilicate and acid added in said molar ratio of calcium to phosphorus.
6. A method according to claim 1, said reaction being carried out with the addition of heat.
7. A method according to claim 1, also comprising subjecting said reaction product to additional heat after reaction.
8. A method according to claim 1, said calcium metasilicate being wollastonite.

References Cited
FOREIGN PATENTS 641,608    8/1950    Great Britain _____ 106—306
680,116    2/1964    Canada _____ 106—306

JAMES E. POER, Primary Examiner

U.S. Cl. X.R.

160—288B